United States Patent
Yoshihiro et al.

(10) Patent No.: US 6,913,352 B2
(45) Date of Patent: Jul. 5, 2005

(54) ACTINIC RADIATION CURING JET PRINTING INK

(75) Inventors: Yasuo Yoshihiro, Tokyo (JP); Kaori Nakano, Tokyo (JP); Yoshihiro Fuse, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/398,286

(22) PCT Filed: Oct. 9, 2001

(86) PCT No.: PCT/JP01/08850

§ 371 (c)(1),
(2), (4) Date: Apr. 10, 2003

(87) PCT Pub. No.: WO02/31066

PCT Pub. Date: Apr. 18, 2002

(65) Prior Publication Data

US 2004/0021753 A1 Feb. 5, 2004

(30) Foreign Application Priority Data

Oct. 10, 2000 (JP) ........................................ 2000-308613
Feb. 19, 2001 (JP) ........................................ 2001-41077

(51) Int. Cl.⁷ ................................................. B41J 2/01
(52) U.S. Cl. .......................... 347/100; 347/96; 523/160
(58) Field of Search .......................... 347/100, 96, 95, 347/101; 523/160; 106/31.6, 31.13, 31.27

(56) References Cited

U.S. PATENT DOCUMENTS 6,005,023 A * 12/1999 Anton et al. ............. 106/31.13
6,348,519 B1 * 2/2002 Ohshima et al. ............. 101/129
6,433,038 B1 * 8/2002 Tanabe et al. ............ 106/31.13
2003/0003398 A1 * 1/2003 Tamura et al. ............ 430/280.1
2003/0049995 A1 * 3/2003 Schutz et al. .................. 451/41

FOREIGN PATENT DOCUMENTS

| EP | 465039 | 1/1982 |
| JP | 58-32674 | 2/1983 |
| JP | 62-064874 | 3/1987 |
| JP | 3-258867 | 11/1991 |
| JP | 3-258868 | 11/1991 |
| JP | 9-183929 | 7/1997 |
| JP | 10-219158 | 8/1998 |
| JP | 2001-288387 | 10/2001 |
| WO | 99/07796 | 2/1999 |

* cited by examiner

*Primary Examiner*—Manish S. Shah
(74) *Attorney, Agent, or Firm*—Oblon, Spivak, McClelland, Maier & Neustadt, P.C.

(57) ABSTRACT

Disclosed is an active energy beam curable inkjet printing ink including a pigment, a compound containing two or more ethylenic double bonds, a compound containing one ethylenic double bond and having a molecular weight of 90 to 210, 2-benzyl-2-dimethylamino-1-(4-morpholinophenyl)-butanone-1 as a first initiator, and acylphosphine oxides as a second initiator. The ink has low viscosity, excellent photo-polymerizability, remarkably excellent curing property, good dispersion stability, causes no dissolution and swelling of ink contacting materials in a printer, and shows excellent discharge stability from nozzles, an excellent adherence property to a recording medium, excellent solvent resistance and water resistance.

6 Claims, No Drawings

ACTINIC RADIATION CURING JET PRINTING INK

FIELD OF THE INVENTION

The present invention relates to an active energy beam curable inkjet printing ink. More particularly, the present invention relates to an active energy beam curable inkjet ink which is excellent in photo-polymerizability, has an excellent curing property and good stability as an ink, and also causes no dissolution and no swelling of ink-contacting materials in a printer, has an excellent discharge stability from a nozzle, has an excellent adhesion property to recording media, excellent solvent resistance and water resistance.

BACKGROUND OF THE INVENTION

Conventionally, as inkjet inks excellent in water resistance, there are those obtained by dispersing or dissolving an oil-soluble dye in a high boiling point solvent and those obtained by dissolving an oil-soluble dye in a volatile solvent.

As to colorants that have been used, dyes are inferior to pigments in various kinds of resistance such as light resistance. However, it is generally not easy to disperse a pigment stably in an organic solvent, and it is usually difficult to secure a stable dispersibility and discharging property.

As to ink solvents, an ink using a high boiling point solvent shows no solvent volatilization on a non-absorbing type recording medium, and manifests difficult drying through the evaporation of solvents, hence impossibility of printing onto non-absorbing type substrates. On the other hand, in the case of an ink using a volatile organic solvent, it is possible to form excellent prints even on a non-absorbing substrate by the adhesive property of a resin used and evaporation of solvents. However, since a volatile solvent is the main component of the ink, drying by volatilization of a solvent is very quick on the nozzle surface of a head, and frequent maintenance is required. Further, as inks are essentially required to be re-soluble in solvents, resistance to solvents is not sufficiently obtained in some cases.

While there have been such various problems, there is also a utilization of inks of the type which prevents drying in a head by using non-volatile monomers and completes hardening by providing active energy rays. Such inks are disclosed, for example, in Japanese Patent Application Laid-Open (JP-A) Nos. 62-64874 and 58-32674. These inks are typically used in printers of continuous type, and particularly, inks having a viscosity of 3 to 5 mPa·s are generally used. Since this type of printer discharges inks continuously, a plurality of volatile solvents can be used together and in large amounts, and control of viscosity of the inks and impartment of volatility are relatively easy.

On the other hand, in an on demand mode printer using a piezo element, use of a large amount of volatile solvents increases frequency of maintenance and tends to cause a problem of dissolution and swelling of ink contact materials in a printer Also, volatile solvents are restrained more strictly as a hazardous material defined by the fire protection law. In the case of an on demand type printer using a piezo element, an ink having a smaller amount of volatile solvents is thus required. However, materials used in an active energy beam curable ink have been had relatively high viscosity. Inks having so low viscosity as to enable discharge also in a conventional type printer, an excellent curing property, and excellent stability, have not been obtained until now.

One object of the present invention is to provide an active energy beam curable inkjet ink having low viscosity, excellent photo-polymerizability, excellent curing property, and good stability.

Another object of the present invention is to provide an active energy beam curable inkjet ink causing no dissolution and swelling of ink contact materials in a printer, and showing excellent discharge stability from nozzles, excellent adherence to a recording medium, and excellent solvent resistance and water resistance.

SUMMARY OF THE INVENTION

The present invention is an active energy beam curable inkjet printing ink comprising a pigment, a compound containing two or more ethylenic double bonds, a compound containing one ethylenic double bond and having a molecular weight of 90 to 210, 2-benzyl-2-dimethylamino-1-(4-morpholinophenyl)-butanone-1 as a first initiator, and acylphosphine oxides as a second initiator.

In the present invention, it is preferable that the compound containing one ethylenic double bond is 2-phenoxyethyl acrylate. It is preferable that the inkjet printing ink further comprises a pigment dispersing agent. It is preferable that the inkjet printing ink does not contain a non-reactive solvent. The pigment contained in the inkjet printing ink of the present invention is preferably in the form of pigment particles having an average particle size of 10 to 150 nm. The inkjet printing ink according to the present invention has preferably a viscosity at 25° C. of 5 to 50 mPa·s.

The inkjet printing ink of the present invention is an ink obtained by dispersing a pigment in an active energy ray-hardening compound. The inkjet printing ink has low viscosity, causes no dissolution and swelling of ink contact materials in a printer, and has excellent photo-polymerizability, very good curing property and excellent dispersion stability. It also shows very good discharge stability from nozzles. When inkjet recording/printing is conducted using the ink of the present invention, a recorded material showing high transparency and having excellent gloss and various resistive properties can be obtained.

DETAILED DESCRIPTION OF THE INVENTION

As a pigment contained in the inkjet ink of the present invention, achromatic pigments such as carbon black, titanium oxide, and calcium carbonate or chromatic organic pigments may be used. Examples of the organic pigment include insoluble azo pigments such as toluidine red, toluidine maroon, hansa yellow, benzidine yellow, and pyrazolone red, soluble azo pigments such as lithol red, helio bordeaux, pigment scarlet, and permanent red 2B, derivatives from vat dyes such as alizarin, indanthrone, and thioindigo maroon, phthalocyanine-type organic pigments such as phthalocyanine blue and phthalocyanine green, quinacridone-type organic pigments such as quinacridone red and quinacridone magenta, perylene-type organic pigments such as perylene red and perylene scarlet, isoindolinone-based organic pigments such as isoindolinone yellow and isoindolinone orange, pyranethrone-type organic pigments such as pyranethrone red and pyranethrone orange, thioindigo-type organic pigments, condensed azo-type organic pigments, benzimidazolone-type organic pigments, quinophthalone-type organic pigments such as quinophthalone yellow, isoindoline-type organic pigments such as isoondoline yellow, and other pigments such as fravanethrone yellow, acylamide yellow, nickel azo yellow, copper azo methine yellow, perynone orange, anthrone orange, dianthraquinonyl red, and dioxazine violet.

Using color index (C.I.) numbers, examples of the organic pigments include C.I. Pigment Yellow 12, 13, 14, 17, 20, 24, 74, 83, 86, 93, 109, 110, 117, 125, 128, 129, 137, 138, 139, 147, 148, 150, 151, 153, 154, 155, 166, 168, 180, 185, C.I. Pigment Orange 16, 36, 43, 51, 55, 59, 61, C.I. Pigment Red 9, 48, 49, 52, 53, 57, 97, 122, 123, 149, 168, 177, 180, 192, 202, 206, 215, 216, 217, 220, 223, 224, 226, 227, 228, 238, 240, C.I. Pigment Violet 19, 23, 29, 30, 37, 40, 50, C.I. Pigment Blue 15, 15:1, 15:3, 15:4, 15:6, 22, 60, 64, C.I. Pigment Green 7, 36, and C.I. Pigment Brown 23, 25, 26.

Among the above-mentioned pigments, quinacridone-type organic pigments, phthalocyanin-type organic pigments, benzimidazolone-type organic pigments, isoindolinone-type organic pigments, condensed azo-type organic pigments, quinophthalone-type organic pigments, isoindoline-type organic pigments and the like are preferable because of their excellent light resistance.

The organic pigment is preferably a fine pigment having an average particle size of 10 to 150 nm in terms of measured values by laser scattering. When the pigment has an average particle size of less than 10 nm, the light resistance will be lowered due to the decrease in particle size. When, on the contrary, over 150 nm, stable maintenance of dispersion becomes difficult and precipitation of the pigment tends to occur.

Fine organic pigment production can be conducted, for example, according to the following method. That is, a mixture composed of at least three components, an organic pigment, a water-soluble inorganic salt in an amount three times or more by weight that of the organic pigment, and a water-soluble solvent is prepared as a clay-like mixture, and the mixture is strongly kneaded by a kneader and the like so as to be fined before charging into water. The mixture is then stirred by a high speed mixer and the like to give a slurry. Then, filtration and water-washing of the slurry are repeated, to remove the water-soluble inorganic salt and the water-soluble solvent. In the fine particle production process, resins, pigment dispersing agents and the like may be added.

Examples of the water-soluble inorganic salt include sodium chloride and potassium chloride. These inorganic salts are used in an amount of 3 times weight or more, and preferably 20 times weight or less of the organic pigment. When the amount of the inorganic salt is less than 3 times weight, a treated pigment having a desired size is not obtained. When it is over 20 times weight, washing treatment in a subsequent process will be enormous, and the substantial treated amount of the organic pigment decreases.

The water-soluble solvent is used to make suitable clay-like condition of the organic pigment and the water-soluble inorganic salt used as a milling aid, and to efficiently conduct sufficient milling, and is not particularly restricted providing it is a solvent soluble in water. However, a solvent having a high boiling point of 120 to 250° C. is preferable from the standpoint of safety since in kneading, the temperature increases and the solvent manifests a condition of easy evaporation. Examples of the water-soluble solvent include 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether and lower molecular weight polypropylene glycol.

In the present invention, it is preferable that a pigment is contained in an amount of 3 to 15% by weight in the inkjet ink in order to obtain a sufficient concentration and sufficient light resistance.

Examples of a compound which contains two or more ethylenically unsaturated double bonds include those referred to as prepolymers, oligomers and the like. Specific examples include ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentyl glycol di(meth)acrylate, ethoxylated neopentyl glycol di(meth)acrylate, propoxylated neopentyl glycol di(meth)acrylate, tripropylene glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, dimethylol tricyclodecane diacryalte, hydroxypivalic neopentyl glycol diacrylate, 1,3-butylene glycol di(meth)acrylate, ethoxylated bisphenol A di(meth)acrylate, propoxylated bisphenol A di(meth) acrylate, cyclohexane dimethanol di(meth)acrylate, dimethylol dicyclopentane diacrylate, trimethylolpropane triacrylate, ethoxylated trimethylolpropane triacrylate, propoxylated trimethylolpropane triacrylate, pentaerythritol triacrylate, tetramethylolpropane triacrylate, tetramethylolmethane triacrylate, pentaerythritol tetraacrylate, caprolactone-modified trimethylolpropane triacrylate, ethoxylated isocyanuric triacrylate, tri(2-hydroxyethyl isocyanurate) triacrylate, propoxylate glyceryl triacrylate, tetramethylolmethane tetraacrylate, pentaerythritol tetraacrylate, ditrimethylolpropane tetraacrylate, ethoxylated pentaerythritol tetraacrylate, dipentaerythritol hexaacrylate, neopentyl glycol oligo acrylate, 1,4-butanediol oligo acrylate, 1,6-hexanediol oligo acrylate, trimethylolpropane oligo acrylate, pentaerythritol oligo acrylate, urethane acrylate, epoxy acrylate and polyester acrylate. These compounds may be used singly or in combination of two or more if necessary.

These compounds, which contain two or more ethylenic double bonds, are used preferably in an amount of 15 to 60% by weight in the ink, since in such an amount the curing speed and the cross-linking concentration will be high and the water resistance, hardness, and gloss are improved.

As a compound containing one ethylenic double bond, that is to be contained in the inkjet ink, those having a molecular weight of 90 to 210 are excellent in photopolymerizability, show a good curing property and excellent stability, and cause no problems such as dissolution and swelling of ink-contacting materials in a printer. When the molecular weight is less than 90, stability is poor though the curing property is excellent, and dissolution and swelling of ink-contacting materials occur in a printer. Also, among such compounds, those harmful to human bodies and likely to cause cancer are included. Contrary, when the molecular weigh is over 210, problems like dissolution and swelling of ink contacting materials in a printer will not be caused, and stability is excellent. Yet, curing properties will be quite inferior though.

Examples of the compound containing one ethylenic double bond and having a molecular weight of 90 to 210 include 2-phenoxyethyl acrylate, acryloyl morpholine, N-vinyl caprolactam, 2-hydroxyethyl acrylate, 2-hydroxypropyl acrylate, 4-hydroxybutyl acrylate, isobutyl acrylate, t-butyl acrylate, isooctyl acrylate, isobonyl acrylate, cyclohexyl acrylate, 2-methoxyethyl acrylate, methoxytriethylene glycol acrylate, 2-ethoxyethyl acrylate, tetrahydrofurfuryl acrylate, 3-methoxybutyl acrylate, benzyl acrylate, ethoxyethoxyethyl acrylate, butoxyethyl acrylate, ethoxydiethylene glycol acrylate, methoxydipropylene glycol acrylate, methylphenoxyethyl acrylate and dipropylene glycol acrylate.

These compounds containing one ethylenic double bond and having a molecular weight of 90 to 210 may be used singly or in combination of two or more. Particularly among them, 2-phenoxyethyl acrylate can be preferably used. It is preferable that the amount of these compounds used in an ink is from 20% to 75% by weight. When the amount is less than 20% by weight, the viscosity of the ink will increase, and will make the discharge from an inkjet printer impossible. The durability of printed matters will deteriorate when the amount exceeds 75% by weight.

Preferable as the photo-polymerization initiator according to the present invention are those easily absorbing peak wavelength lights between 300 nm to 450 nm emitted mainly from an ultraviolet lamp or an ultraviolet laser, those showing excellent compatibility with a photo-polymerizable compound, and photo-chemically, those having a quantum efficiency near 1. Further, for enhancing photo-polymerization initiation efficiency, a photo-polymerization promoter may be used in combination. The present inventors have found that high sensitivity is obtained when a photo-polymerization initiator is combined with 2-benzyl-2-dimethylamino-1-(4-morpholinophenyl)-butanone-1 and acylphosphine oxides. The reason for this is hypothesized that when irradiated with an activation light beam, the latter is self dissociated efficiently, and produces radicals, due to the energy or electrons transferred from the former.

In general, when the addition amount of a photo-polymerization initiator increases, a curing property becomes more excellent, while the viscosity of the ink increases. Therefore, in the case of active energy beam curable ink jet inks, an initiator giving expectancy of the effect with a small amount addition has conventionally been desired. Since the photo-polymerization initiator component of the present invention, 2-benzyl-2-dimethylamino-1-(4-morpholinophenyl)-butanone-1 has a relatively high molecule absorption coefficient, it easily absorbs active ray even if carbon black tending to disturb light transmittance in a photo-sensitive layer is present. Further, since the maximum absorption wavelength ($\lambda_{max}$) is around 365 nm, the sensitivity is high because of the coincidence with the peak wavelength of lights such as those of an ultraviolet lamp. Therefore, a sufficient effect can be obtained with a small addition amount. It is preferable that this initiator is used in an amount of 0.1 to 5% by weight in the ink. Examples of the acylphosphine oxide include 2,4,6-trimethylbenzoyldiphenylphosphine oxide and bis(2,4,6-trimethylbenzoyl)acylphosphine oxide. Particularly, bis(2,4,6-trimethylbenzoyl)acylphosphine oxide can be mentioned. It is preferable that it is used in an ink in an amount of 5 to 10% by weight. With the constitution of single use of these photo-polymerization initiators, a sufficient curing property cannot be obtained, and resultantly, the use amount of an expensive photo-polymerization initiator increases, to cause increase in the viscosity of the ink, being economically undesirable.

As the photo-polymerization promoter, for example, ethyl p-dimethylaminobenzoate, 4,4'-dimethylaminobenzophenone, and 4,4'-diethylaminobenzophenone are listed. These photo-polymerization promoters can be used singly or in combination of two or more.

In the ink jet ink of the present invention, it is preferable to compound an aromatic derivative such as hydroquinone, p-methoxyphenol, t-butyl catechol, pyrogallol and the like in an amount of 0.01 to 5% by weight in an ink, for enhancing stability with time of the ink and stability on machine in a printing device.

As the pigment dispersing agent of the present invention, for example, hydroxyl group-containing carboxylates, salts of long chain polyaminoamides with high molecular weight acid esters, salts of high molecular weight polycarboxylic acids, salts of long chain polyaminoamides with polar acid esters, high molecular weight unsaturated acid esters, high molecular weight copolymers, modified polyurethanes, modified polyacrylates, polyether ester type anionic activating agents, naphthalenesulfonic acid formalin condensate salts, aromatic sulfonic acid formalin condensate salts, polyoxyethylenealkyl phosphates, polyoxyethylene nonylphenyl ethers, stearylamine acetate and pigment derivatives are listed.

Specific examples of the pigment dispersing agent include: Anti-Terra-U (polyaminoamide phosphoric acid salt) made by BYK Chemie; Anti-Terra-203/204 (high molecular weight polycarboxylic acid salt); Disperbyk-101 (polyaminoamide phosphoric acid salt and acid ester), 107 (hydroxyl group-containing carboxylate), 110 (copolymer containing acid group), 130 (polyamide), 161, 162, 163, 164, 165, 166, and 170 (high molecular weight copolymer); 400; Bykumen (high molecular weight unsaturated acid ester); BYK-P104 and P105 (high molecular weight unsaturated polycarboxylic acid); P104A and 240S (high molecular weight unsaturated polycarboxylic acid and silicone-based substance); and, Lactimon (long chain amine and unsaturated polycarboxylic acid and silicone).

Other examples thereof include: Efka 44, 46, 47, 48, 49, 54, 63, 64, 65, 66, 71, 701, 764 and 766 made by Efka CHEMICALS; Efka Polymer 100 (modified polyacrylate), 150 (aliphatic modified polymer), 400, 401, 402, 403, 450, 451, 452, 453 (modified polyacrylate) and 745 (copper phthalocyanine-based); Florene TG-710 (urethane oligomer) made by KYOEISHA CHEMICAL CO. LTD; Flonone SH-290 and SP-1000; "Polyflow No. 50E, No. 300 (acrylic copolymer); Disperon KS-860, 873SN, 874 (high molecular weight dispersing agent), #2150 (aliphatic polyvalent carboxylic acid) and #7004 (polyether ester type) made by KUSUMOTO CHEMICALS LTD.

Further examples thereof include: Demol RN, N (naphthalenesulfonic acid formalin condensate sodium salt), MS, C, SN-B (aromatic sulfonic acid formalin condensate sodium salt), and EP, made by Kao Corp.; Homogenol L-18 (polycarboxylic acid type polymer), Emargen 920, 930, 931, 935, 950, 985 (polyoxyethylene nonylphenyl ether), Acetamine 24 (coconut amine acetate), and 86 (stearylamine acetate); Solsperse 5000 (phthalocyanine ammonium salt-based), 13240, 13940 (polyesteramine-based), 17000 (fatty acid amine-based), 24000, and 32000, made by Zeneka; Nikol T106 (polyoxyethylene sorbitane monooleate), MYS-IEX (polyoxyethylene monostearate), and Hexagline 4-0 (hexaglyceryl tetraoleate) made by Nikko Chemicals Co. LTD.

A pigment dispersing agent is preferably contained in an amount of 0.1 to 10% by weight in the ink.

The inkjet ink of the present invention is produced, for example, by sufficiently dispersing a pigment together with an active energy beam-curing compound and a pigment dispersing agent by using a usual dispersing machine such as a sand mill. It is preferable that a concentrate having a high pigment concentration is previously produced and diluted with an active energy beam curable compound. Since sufficient dispersion is possible by using a usual dispersing machine, it does not take any extra energy and duration for the dispersion process. Consequently, it is not likely to cause any modifications in the ink components during the dispersion and an ink which has excellent stability is obtained. It is preferable that the ink is filtrated through a filter having a pore diameter of 3 μm or less, further preferably 1 μm or less.

It is preferable that the viscosity at 25° C. of the inkjet ink according to the present invention is controlled at as high as 5 to 50 mPa·s. An ink with a viscosity at 25° C. of 5 to 50 mPa·s shows a stable discharge property particularly on a head of a usual frequency of 4 to 10 kHz and even on a head of a high frequency of 10 to 50 kHz.

When an ink with a viscosity of less than 5 mPa·s is used, a well-timed operation of discharge will be deteriorated. When an ink with a viscosity of over 50 mPa·s is used, a discharge itself will be weakened even if some mechanism which lowers the viscosity by heating is incorporated in the head, and the discharge stability may deteriorate, leading to no discharge at all.

It is preferable that the inkjet ink of the present invention is an ink which gives a conductivity of 10 μS/cm or less in a piezo head and shows no electric corrosion in the head. In a continuous type, it is necessary to control the conductivity by an electrolyte, and in this case it is necessary to control the conductivity to 0.5 mS/cm or more.

In order to utilize an inkjet ink of the present invention, first it is fed to a printer head of an inkjet recording type printer, and is discharged from the printer head onto a substrate. Then, an irradiation with active energy rays such as ultraviolet rays and electron beams is conducted. By the irradiation, the composition on a printing medium is hardened quickly.

As a source of active energy rays, in the case of irradiation with ultraviolet rays, for example a high pressure mercury lamp, metal halide lamp, low pressure mercury lamp, ultra-high pressure mercury lamp, ultraviolet laser or sunlight may be used. When hardening is conducted with electron beams, it is usually effected with an electron beam having an energy of 300 eV or less. However, it is also possible to effect hardening instantly with an irradiation amount of 1 to 5 M rad.

EXAMPLES

The present invention will be further illustrated in detail below based on examples. Parts and % in the examples are parts by weight and % by weight, respectively.

A pigment, a dispersing agent and a monomer shown in Table 1 were charged together in a sand mill and dispersed for 4 hours, to obtain active energy beam curable IJ ink raw liquid. Next, an initiator was added to the ink raw liquid, and mixed gently until dissolution of the initiator. Then, it was filtrated under pressure through a membrane filter to obtain an active energy beam curable IJ ink.

Printing was conducted on various substrates (polycarbonate, polystyrene, ABS (acetonitrile-styrene-butadiene copolymer), polyvinyl chloride, polyethylene teraphthalate, and polybutylene terephthalate) using thus obtained inks by an IJ printer having a piezo head. Then, hardening of a printed body was conducted under a condition of a transfer speed of 10 meter per minute by using a UV irradiation apparatus (one metal halide lamp, out put 120 W).

TABLE 1

| | | | Example No. | | | | | | | |
|---|---|---|---|---|---|---|---|---|---|---|
| | | | 1 | 2 | 3 | 4 | 5 | 6 | 7 | 8 |
| Pigment | P1 | | 5 | 5 | | | | | | |
| | P2 | | | | 5 | 5 | | | | |
| | P3 | | | | | | 5 | 5 | | |
| | P4 | | | | | | | | 5 | 5 |
| Monomer | PEA | Molecular weight: 192 | 60 | | 45 | | 60 | | 60 | 50 |
| | ACMO | 141 | | 45 | | | | 45 | | |
| | IBXA | 208 | | | | 45 | | | | |
| | TMPTA | 296 | | 35 | | | 35 | | 35 | 20 |
| | NPGDA | 212 | | | 50 | | | 50 | | |
| | HDDA | 226 | | | 50 | 50 | | | | 25 |
| Dispersing agent | 13940 | | 3 | 3 | | | | | | |
| | 24000 | | | | | | 3 | 3 | | |
| | 5000 | | 1.5 | 1.5 | | | | | | |
| | 22000 | | | | 1.5 | 1.5 | 1.5 | 1.5 | | |
| | L-18 | | | | 3 | 3 | | | | |
| | Efka 49 | | | | | | | | 4.5 | 4.5 |
| Initiator | 369 | | 3 | 4 | 3 | 4 | 3 | 4 | 5 | 5 |
| | 819 | | 5 | | 5 | | 5 | | 5 | |
| | TPO | | | 5 | | 5 | | 5 | | 5 |

Numerical values indicate parts.

Pigments, monomers, dispersing agents, and initiators in Table 1 are as follows, respectively:

Pigment

Pigment P1

250 parts of crude copper phthalocyanine ("Copper Phthalocyanine" manufactured by Toyo Ink MFG. CO. LTD.), 2500 parts of sodium chloride and 160 parts of polyethylene glycol ("Polyethylene Glycol 300", manufactured by Tokyo Kasei K.K.) were charged in a stainless 1 gallon kneader (manufactured by Inoue Manufacturing Co. LTD.), and kneaded for 3 hours. Then, the mixture was added into 2.5 liter hot water, and stirred for about 1 hour by a high speed mixer while heating at about 80° C. to give a slurry. Next, filtration and water-washing were repeated 5 times to remove sodium chloride and solvents. Then, the slurry was subjected to spray drying to obtain a dry, treated pigment P1.

Pigment P2

250 parts of a quinacridone-type red pigment ("Cinquasia Magent RT-355-D", manufactured by Ciba Geigy), 2500 parts of sodium chloride and 160 parts of "Polyethylene Glycol 300" were charged in a stainless 1 gallon kneader, and the same procedure was effected as for Pigment P1 to obtain a treated pigment P2.

Pigment P3

250 parts of a benzimidazolone-type yellow pigment ("Hostaperm Yellow H3G", manufactured by Hoechst), 2500 parts of sodium chloride and 160 parts of "Polyethylene Glycol 300" were charged in a stainless 1 gallon kneader, and the same procedure was effected as for Pigment P1 to obtain a treated pigment P3.

Pigment P4

A carbon black pigment "Printex 150T" (manufactured by Degussa) was used as Pigment P4.

Monomer

"PEA": 2-phenoxyethyl acrylate (Viscoat #192, manufactured by OSAKA ORGANIC CHEMICAL INDUSTRY LTD.)

"ACMO": acryloylmorpholine (ACMO, manufactured by KOHJIN Co. Ltd.)

"IBXA": isobonyl acrylate (IBXA, manufactured by OSAKA ORGANIC CHEMICAL INDUSTRY LTD.)

"TMPTA": trimethylolpropane triacrylate (KS-TMPTA, manufactured by Nippon Kayaku Co., Ltd.)
"NPGDA": neopentyl glycol diacrylate (KAYARAD MANDA, manufactured by Nippon Kayaku Co., Ltd.)
"HDDA": 1,6-hexanediol diacrylate (KS-HDDA, manufactured by Nippon Kayaku Co., Ltd.)

Dispersing Agent

"13940": polyester amine-based dispersing agent ("Solsperse 13940", manufactured by Zeneka)
"24000": aliphatic modified dispersing agent ("Solsperse 24000", manufactured by Zeneka)
"5000": blue pigment dispersing agent ("Solsperse 5000", manufactured by Zeneka)
"22000": yellow pigment dispersing agent ("Solsperse 22000", manufactured by Zeneka)
"L-18": polycarboxylic acid type polymer dispersing agent ("Homogenol L-18", manufactured by Kao Corp.)
"Efka"49; modified polyacrylate-based dispersing agent ("Efka 49", manufactured by Efka CHEMICAL)

Initiator

"369": 2-benzyl-2-dimethylamino-1-(4-morpholinophenyl)-butanone-1 ("Irgacure 369", manufactured by Ciba Speciality Chemicals)
"TPO": 2,4,6-trimethylbenzoyl diphenylphosphine oxide ("Lucirine TPO", manufactured by BASF)
"819": bis(2,4,6-trimethylbenzoyl)-phenylphosphine oxide ("Irgacure 819", manufactured by Ciba Speciality Chemicals)

COMPARATIVE EXAMPLES

A pigment, a dispersing agent and a monomer shown in Table 2 were charged together in a sand mill and dispersed for 4 hours, to obtain an active energy beam curable IJ ink raw liquid. Next, a photo initiator is added to the ink raw liquid, and mixed gently until dissolution of the photo initiator. Then, this was filtrated under pressure through a membrane filter to obtain an active energy beam curable IJ ink. Printing was conducted on the substrate above-mentioned using thus obtained ink by an IJ printer having a piezo head. Then, hardening of a printed body was conducted under a condition of a transfer speed of 10 meter per minute by a UV irradiation apparatus (a metal halide lamp: out put 120 W).

TABLE 2

|  |  | Comparative Example No. | 1 | 2 | 3 | 4 | 5 | 6 | 7 | 8 |
|---|---|---|---|---|---|---|---|---|---|---|
| Pigment | P1 |  | 5 | 5 | 5 | 5 |  |  |  |  |
|  | P4 |  |  |  |  |  | 5 | 5 | 5 | 5 |
| Monomer/ Pre-polymer | PEA | Molecular weight: 192 | 60 | 60 |  |  | 60 | 60 |  |  |
|  | NVF | 71 |  |  | 45 |  |  |  | 45 |  |
|  | LA | 240 |  |  |  | 60 |  |  |  | 60 |
|  | TMPTA | 296 | 35 | 35 | 50 | 35 | 35 | 35 | 50 | 35 |
| Dispersing agent | 13940 |  | 3 | 3 | 3 | 3 |  |  |  |  |
|  | 5000 |  | 1.5 | 1.5 | 1.5 | 1.5 |  |  |  |  |
|  | Efka 49 |  |  |  |  |  | 4.5 | 4.5 | 4.5 | 4.5 |
| Initiator | 369 |  | 5 |  | 3 | 3 | 5 |  | 3 | 3 |
|  | 819 |  |  | 7 | 5 | 5 |  | 7 | 5 | 5 |
|  | 651 |  | 5 |  |  | 5 |  |  |  |  |

Numerical values indicate parts.

Components in Table 2 are as follows:
Pigment
Pigments P1 and P2 in Table 2 were the same compounds as in Examples 1 to 8.

Dispersing Agent
These are as already described.
Initiator
"651" is 2,2-dimethoxy-1,2-diphenylethane-1-one ("Irgacure 651", manufactured by Ciba Speciality Chemicals). Initiators "369" and "819" are as already described.
Monomer
"NVF" is N-vinylformamide ("Beam Set 770", manufactured by Arakawa Chemical Industries LTD.). "LA" is lauryl acrylate ("NK Ester LA", manufactured by Shin-Nakamura Chemical Co. LTD.). Other monomers are as already described.

Inks and printed materials obtained in Examples 1 to 8 and Comparative Examples 1 to 8 were evaluated on the following items. The results are shown in Table 3.
Viscosity
Viscosity of inks was measured at 25° C. using a B type viscometer. The unit of viscosity is "mPa·s" in Table 3.
Curing Property
Curing properties of inks were quantified by pass numbers required with a UV irradiation apparatus before their tack by finger touch was lost.
Stability with a Lapse of Time
Dispersed conditions of inks after storage for 1 month at 25° C. were evaluated visually and by the measurement of any change in viscosity.
○; Precipitations were not observed, nor the change in viscosity.
Δ: Precipitations were not observed; yet some increase in viscosity was observed.
x: Precipitations were observed.
Stability with Member Materials
Inks were placed on various substrates, and their conditions after left a whole day and night were observed.
⊚; No corrosion was observed in any substrate.
○; Corrosion was observed in one or two types of substrate.
x: Corrosion was observed in almost all substrates.

TABLE 3

Results of Evaluations

| No. | Viscosity | Curing property | Stability with a lapse of time | Suitability with member materials |
|---|---|---|---|---|
| Example 1 | 34.5 | 1 | ○ | ○ |
| 2 | 30.2 | 1 | ○ | ○ |
| 3 | 18.6 | 1 | ○ | ○ |
| 4 | 18.2 | 1 | ○ | ○ |
| 5 | 33.6 | 1 | ○ | ○ |
| 6 | 22.5 | 1 | ○ | ○ |
| 7 | 33.2 | 1 | ○ | ○ |
| 8 | 32.8 | 1 | ○ | ○ |
| Comparative Example 1 | 36.7 | 3 | ○ | ○ |
| 2 | 34.1 | 3 | ○ | ○ |
| 3 | 21.3 | 1 | Δ | X |
| 4 | 30.2 | Not hardened | ○ | ⊚ |
| 5 | 35.9 | 5 | ○ | ○ |
| 6 | 33.5 | 5 | ○ | ○ |
| 7 | 22.0 | 1 | Δ | X |
| 8 | 30.8 | Not hardened | ○ | ⊚ |

What is claimed is:
1. An active energy beam curable inkjet printing ink comprising a pigment, a compound containing two or more ethylenic double bonds, a compound containing one ethylenic double bond and having a molecular weight of 90 to 210, 2-benzyl-2-dimethylamino-1-(4-morpholinophenyl)-butanone-1 as a first initiator, and acylphosphine oxides as a second initiator.

2. The inkjet printing ink according to claim 1, wherein the compound containing one ethylenic double bond is 2-phenoxyethyl acrylate.

3. The inkjet printing ink according to claim 1, further comprising a pigment dispersing agent.

4. The inkjet printing ink according to claim 1, wherein pigment is in the form of pigment particles having an average particle size of 10 to 150 nm.

5. The ink jet printing ink according to claim 1, wherein the inkjet printing ink has a viscosity of 5 to 50 mPa·s at 250° C.

6. A process, comprising:

inkjet printing the inkjet printing ink according to claim 1 onto a plastic surface, and hardening the printed surface with UV irradiation.

* * * * *